United States Patent [19]
Man et al.

[11] Patent Number: 5,407,700
[45] Date of Patent: Apr. 18, 1995

[54] FOOD SAFE COMPOSITION TO FACILITATE SOIL REMOVAL

[75] Inventors: Victor F. Man, Minneapolis; Steven E. Lentsch, St. Paul, both of Minn.

[73] Assignee: Ecolab Inc., St. Paul, Minn.

[21] Appl. No.: 280,017

[22] Filed: Jul. 25, 1994

Related U.S. Application Data

[62] Division of Ser. No. 121,773, Sep. 15, 1993, Pat. No. 5,370,729.

[51] Int. Cl.$^6$ ............................................. B65B 33/00
[52] U.S. Cl. .................................. 427/154; 427/156; 427/385.5; 427/388.4
[58] Field of Search ................ 106/2, 192.2, 199, 206, 106/244, 266; 427/154, 156, 385.5, 388.4

[56] References Cited

U.S. PATENT DOCUMENTS

| | | | |
|---|---|---|---|
| 3,196,027 | 7/1965 | White et al. | 106/287 |
| 3,303,052 | 2/1967 | Hatch et al. | 117/169 |
| 3,460,523 | 8/1969 | Stiles et al. | 126/19 |
| 3,877,972 | 4/1975 | Arnold | 427/384 |
| 4,785,032 | 11/1988 | Touhsaent | 106/128 X |
| 4,877,691 | 10/1989 | Cockrell, Jr. | 428/688 |
| 5,137,793 | 8/1992 | Cockrell | 427/154 X |

FOREIGN PATENT DOCUMENTS

| | | |
|---|---|---|
| 1047903 | 2/1979 | Canada . |
| 3-38254 | 2/1991 | Japan . |
| WO92/02309 | 2/1992 | WIPO . |

*Primary Examiner*—Michael Lusignan
*Attorney, Agent, or Firm*—Merchant, Gould, Smith, Edell, Welter & Schmidt

[57] ABSTRACT

The invention relates to an aqueous coating composition a film or barrier layer. The aqueous coating, in a pseudoplastic thixotropic mixture having a yield point, can be applied to surfaces in heated food preparation units. The composition can be easily applied to a variety of surfaces, and can advantageously cling to vertical or substantially inclined surfaces in order to form a barrier film or coating. The coating can result in a smooth uniform coating. The film, upon heating forms a barrier layer which can facilitate the removal of food soils which can form during food preparation activities after formation of the barrier film layer. The compositions of the invention can be used in methods for coating the interior heated surface of food preparation units by applying the aqueous material through a spray or other aerosol apparatus to form a clinging aqueous coating. Upon heating, the water from the coating can evaporate leaving an organic/inorganic film which can support baked-on food soil and promote easy removal. The compositions and methods of the inventions entail the use of food safe materials approved for contact with comestible substances.

16 Claims, 3 Drawing Sheets

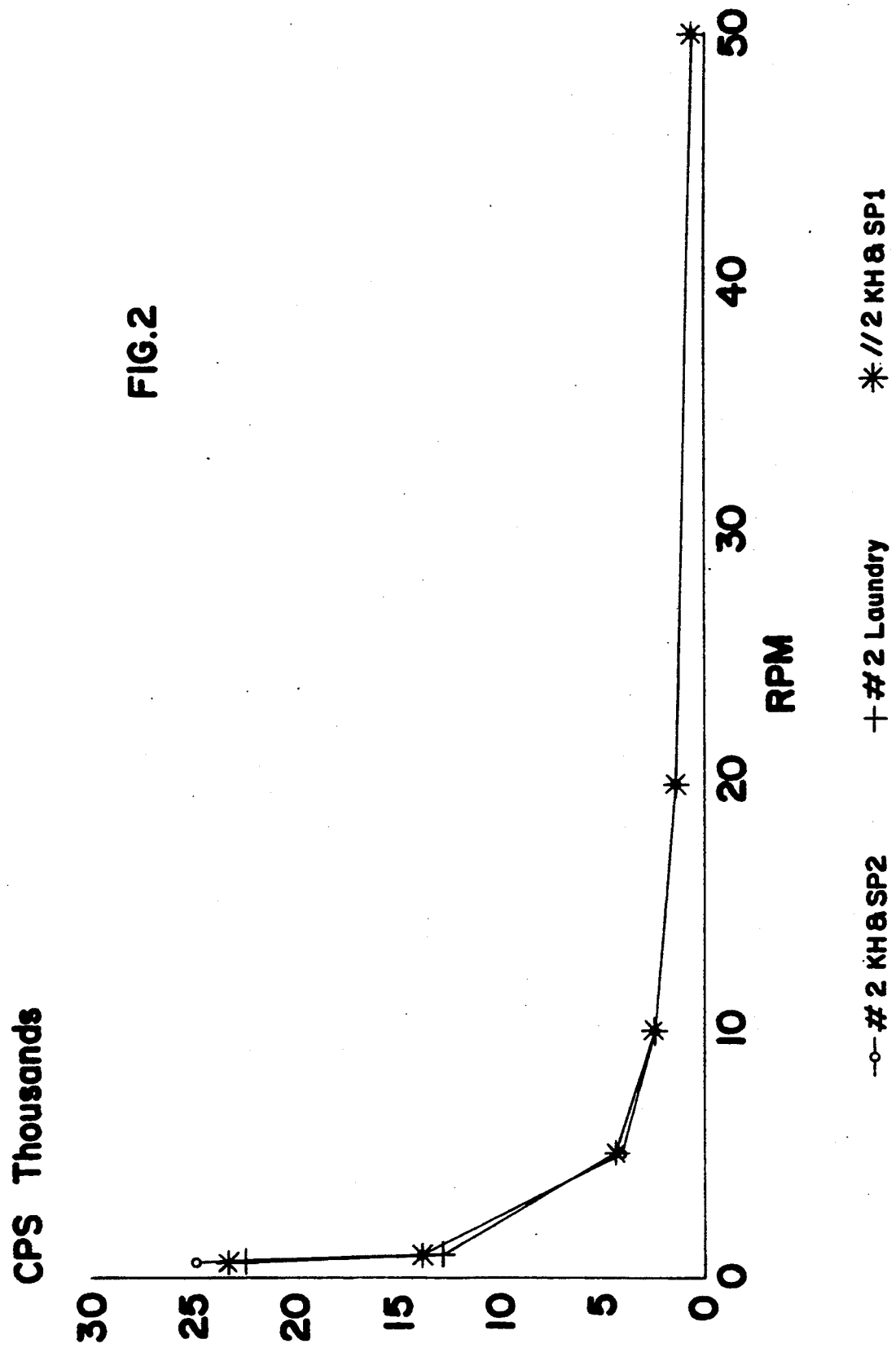

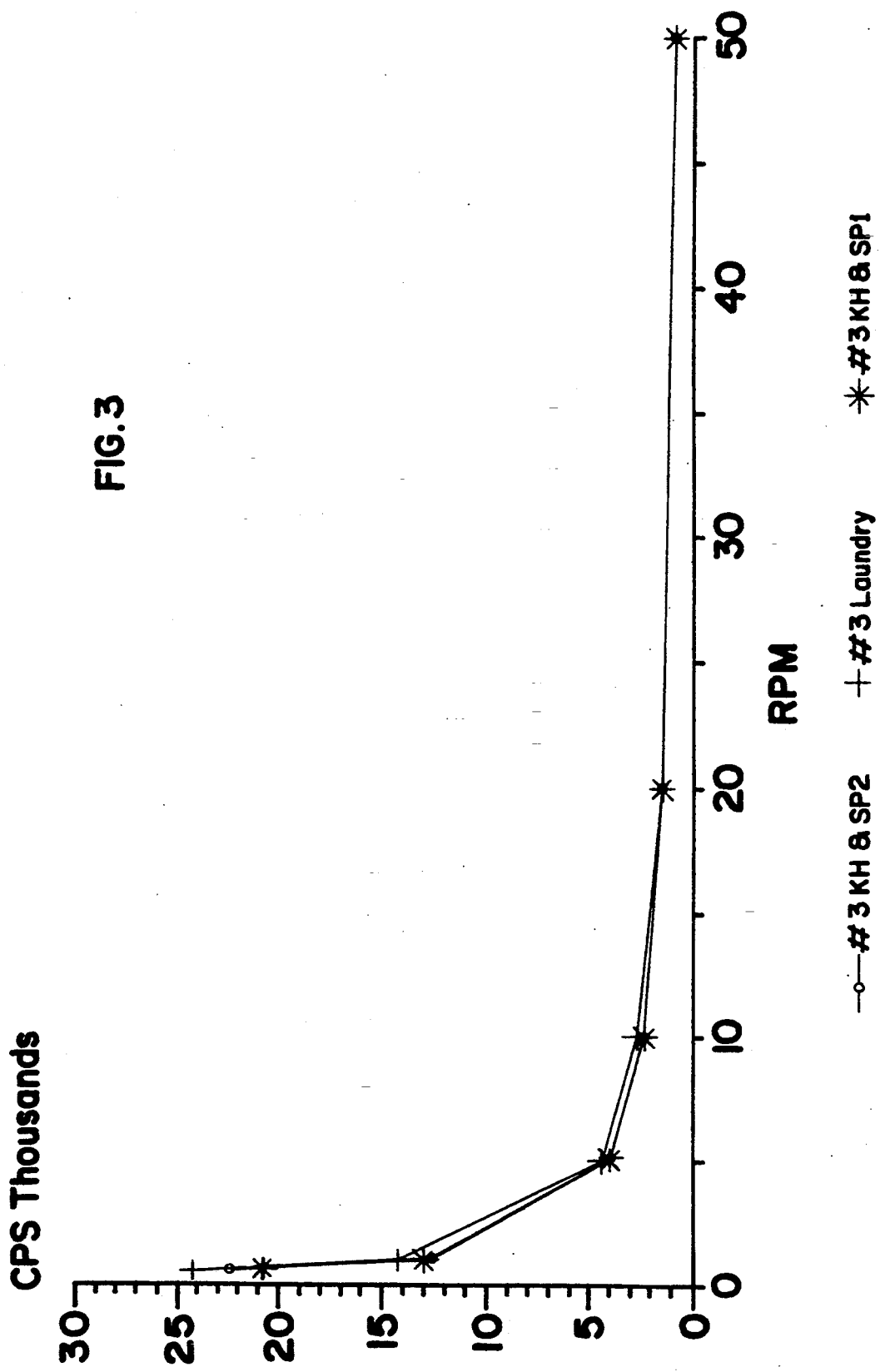

ruary 15, 1994... (omit)

FOOD SAFE COMPOSITION TO FACILITATE SOIL REMOVAL

This is a division of application Ser. No. 08/121,773, filed Sep. 15, 1993, now U.S. Pat. No. 5,370,729.

FIELD OF THE INVENTION

The periodic cleaning of the interior surface of food preparation units including electrically heated ovens, gas fired ovens, microwave ovens, toasters, toaster ovens, etc., and associated surfaces, is a difficult and distasteful task. The food soils involved are often stubborn and disagreeable and cleaners used to remove the soils are harsh. The invention relates to compositions that can be used to introduce a food soil barrier coating onto heated surfaces that come into contact with food soils. The coatings act to promote the removal of such difficult, disagreeable soils from the food preparation unit. The coatings of the invention form a barrier coating, between the hardened baked-on soil and the surfaces of the food preparation unit, that promotes soil removal. Such coatings and residues formed on the coating are then easily removed with scraping and scouring using commercially available cleaning preparations. In many cases the food preparation surfaces can be kept substantially cleaner using less disagreeable and less harsh cleaning preparations.

BACKGROUND OF THE INVENTION

The formation of hard baked-on food soils on surfaces of food preparation units has been a problem faced by institutional cleaning personnel and household individuals for many years. During cooking, food soils commonly come into contact with heated metallic or porcelain surfaces in food preparation units. The food soils, containing various proportions of inorganic materials and of organic proteinaceous, fatty or carbohydrate soils, can become baked-on and can become hard or can be carbonized. Such soils are very difficult to remove, require substantial energy input during cleaning and often require very high concentrations of harsh disagreeable cleaning materials. A substantial need has existed in this art for solutions, other than using stronger cleaners, to improve the effective removal of such soils.

One attempt to reduce the difficulty in removing these soils relates to the use of self-cleaning ovens that ash the soil at high temperatures. Self-cleaning ovens commonly contain a catalytic coating on the interior heated surface of the food preparation unit. Periodically, the food preparation unit is heated to a temperature of about 500°–600° F. At this temperature the catalytic surface is designed to promote the combustion and removal of the hard baked-on soils resulting in ashing the soil which then can be removed without difficulty. One example of such catalytic coatings is found in Stiles et al., U.S. Pat. No. 3,460,523, which is directed to a finely divided thermally stable oxidation catalyst.

Another attempt to reduce the difficulty in removing such baked-on soils is found in attempts to formulate barrier coatings that can be used on heated food preparation units. Examples of such materials include White et al., U.S. Pat. No. 3,196,027, who teach a hydrocarbon solvent containing a dimethyl polysiloxane. Hatch et al, U.S. Pat. No. 3,303,052, teach a hydrophilic synthetic tetrasilicic fluorine mica that is applied to a food preparation surface in the form of an aqueous aerosol used with a fluorocarbon propellant. Arnold, U.S. Pat. No. 3,877,972, teaches a metal phosphate polymer composition which is exemplified by an aluminum ethyl oleyl orthophosphate dissolved in hexane. Dimond, Canadian Patent No. 1,047,903, teaches an oven cleaner composition. The aqueous cleaner, which is not used as a barrier coating, uses as active cleaning ingredients, a substantial proportion of an aqueous base comprising a mixture of sodium hydroxide and monoethanol amine, a clay-like bentonite thickener with other ingredients to form an aerosol oven cleaner. Cockrell, Jr., U.S. Pat. No. 4,877,691 (PCT International Application No. PCT/US91/05092), teaches a pretreatment composition comprising an aqueous dispersion of an inorganic thickening agent such as a Veegum® clay, an inorganic water soluble salt such as sodium or potassium bicarbonate with a small amount of a wetting agent. Cockrell, Jr. states that the use of substantial quantities of organic material, in particular organic thickeners such as xanthan gums, are highly undesirable. Cockrell, Jr. states at Col. 11, lines 9–19, that the barrier coatings containing bicarbonate in the presence of xanthan thickeners have a tendency to decompose spontaneously at room temperature. The evolved carbon dioxide caused difficulty in dispensing the materials from spray containers. Further, the formulas when applied to heated food preparation units resulted in dried films that blistered, were riddled with holes and extremely fragile. The dried films flaked and became separated from the walls of the units. Substantial decomposition of the thickeners were noted.

Makiko et al., Japanese Patent Publication No. 03-038,254, teach a film that provides a hard slippery surface to permit removal of oily stains. The film comprises a layered structure compound and a solid inorganic oxide compound with a polysiloxane binder.

The materials used to form barrier coatings in ovens that promote the release of the baked-on fatty soils have had some success. However, the highly inorganic nature of certain materials renders the partially insoluble coatings difficult to dispense. Further, many barrier coatings, after a number of oven cycles tend to become hardened and difficult to remove with mild aqueous detergents. Lastly, many materials in the prior art tend not to form a sufficient barrier. In many instances, the coatings do not produce a sufficient barrier and do not sufficiently promote soil removal to be acceptable in many institutional or household environments.

A substantial need remains in the art to form an aqueous composition that can be applied to vertical or inclined surfaces to remain in place without sagging. The compositions should provide a thick layer which can act as a substantial barrier between the formation of hardened, carbonized baked-on fatty soils and heated surfaces. The barrier coatings and the baked-on soils should be easily removed without substantial difficulty with mild cleaning compositions.

BRIEF DISCUSSION OF THE INVENTION

We have found that a substantial improvement in the properties of barrier coatings for heated food preparation surfaces can be made by using a combination of a neutral organic fatty component, an inorganic material that has some finite water solubility and an organic water soluble thickener composition. The preferred compositions have a beneficial pseudoplastic or thixotropic profile, such a viscosity profile, viscosity at a specific shear rate, is shown in FIGS. 2 and 3. The materials when sheared have a substantial reduction in viscosity permitting easy application by spray. After application the materials, at rest on a soiled surface, return to a high viscosity after a short time. As a result of this property, the sheared, low viscosity barrier coating can flow for a short time until the initial viscosity is regained. The limited flow results in the formation of a more even continuous coating from the original sprayed pattern. These properties can be quantified in a yield point value derived from the shear stress vs. shear rate hysteresis profile data shown in the graph of FIG. 1. The preferred yield point is about 10–100 dynes-cm$^{-2}$.

These materials, when applied to a food preparation unit can form a coating composition that has some substantial solubility or dispersibility in mild aqueous cleaners, substantial coating capacity and can withstand a variety of heating cycles in commonly available institutional and household ovens while maintaining substantial barrier properties against the build up of food soils. After the composition is applied to a cool surface in the unit, the unit can be heated to dry the film into a robust, somewhat hardened but workable barrier coating.

The compositions of the invention comprise (a) about 0.1 to 30 wt % of an inorganic salt composition that has a water solubility of at least about 1 wt %; (b) about 0.1 to 20 wt % of an alkali metal fatty acid salt; (c) about 1 to 40 wt % of a substantially saturated neutral fat; and (d) about 0.01 to 10 wt % of a substantially water soluble polymeric organic thickener composition formulated in an aqueous diluent. Such a composition is thixotropic (has a yield stress value of about 10–100, preferably 30–80 dynes-cm$^{-2}$) and can be applied to oven surfaces using commonly available spray-on devices to form a stable, non-sagging coating with substantial cling. The coatings formed by spraying these compositions can resist becoming brittle, chipping or flaking at the high temperatures found in food preparation units. The compositions can be made with varying levels of thickness. These coating compositions are substantially soluble or dispersible in aqueous liquids or cleaners and can easily be removed using water or mild aqueous cleaning compositions. The inorganic salt and the fatty acid salt (soap) cooperate with aqueous cleaners to promote removal. The coating compositions of the invention avoid using insoluble inorganic compositions, in particular insoluble inorganic thickeners such as clays which can cause difficulty in removal of the barrier coating after the coatings are exposed to a series of heating cycles. Accordingly, the compositions of the invention are substantially free of any substantial proportion of an insoluble inorganic thickener or clay.

DETAILED DESCRIPTION OF THE INVENTION

Figure 1:
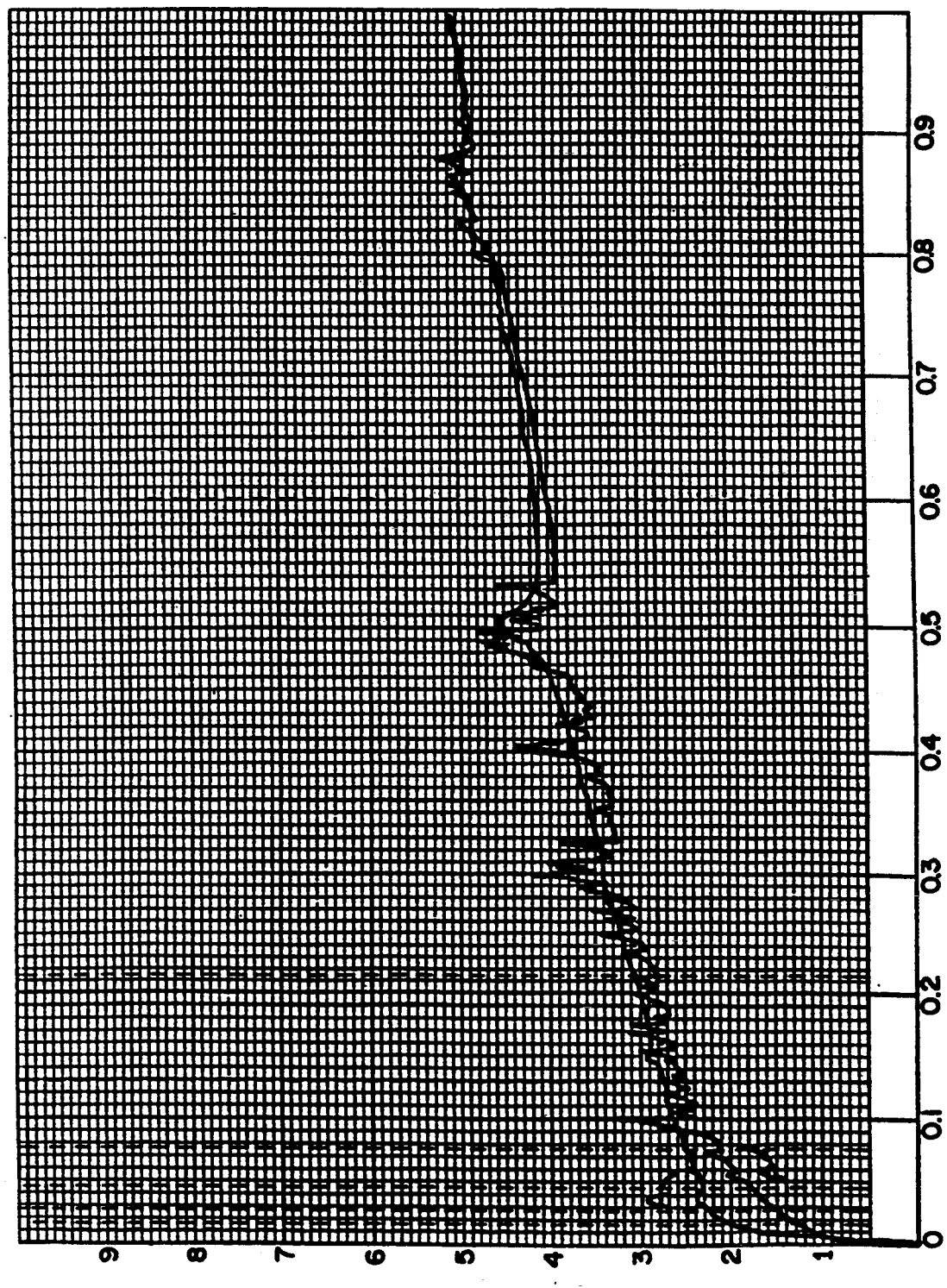

The barrier coating compositions of the invention are made in aqueous solution and contain a soluble inorganic salt. The inorganic salt must have an aqueous solubility at room temperature of at least about 0.1 wt %, preferably about 1 wt % to promote ease of removal. The compositions of the invention use no inorganic material that is substantially insoluble in water to the extent that less than 0.1 wt % of the salt is soluble. Such inorganic salts can comprise alkali metal or alkaline earth metal salts of a variety of commonly available anions including the mineral acids such as hydrochloric acid, sulfuric acid, phosphoric acid, organic acids such as benzoic acid, acetic acid, chloroacetic acid, maleic acid, fumaric acid, succinic acid, etc. Preferred salts are wholly inorganic water soluble, food safe salts including sodium phosphate, potassium phosphate, sodium tripolyphosphate, sodium carbonate, potassium carbonate, sodium bicarbonate, potassium bicarbonate, sodium sulfate, potassium sulfate, etc.

The aqueous compositions of the invention combine the aqueous soluble salt with a salt of the fatty acid. These materials commonly known as soaps, are easily blended in an aqueous dispersion with the inorganic salt to form a substantially uniform material. The soaps aid in wetting the surface of the food preparation unit and participate in forming the barrier coating which can support substantial quantities of proteinaceous or fatty soils. The fatty soaps are commonly made by saponifying natural fats with inorganic base such as sodium or potassium hydroxide or can be made by neutralizing free fatty acids with alkali metal bases such as sodium hydroxide or potassium hydroxide. Highly unsaturated materials can degrade and harm barrier formation. Preferred fats are substantially saturated. While some degree of unsaturation can be tolerated, the maximum concentrations of unsaturation is about 20 mole % of unsaturation or less which corresponds to an I2 value of 50 or less. The substantially saturated fatty acid materials used in the invention can comprise a $C_{6-12}$ fatty acid or mixtures thereof. Examples of such acids include caproic ($C_6$), caprylic ($C_8$), capric ($C_{10}$), lauric ($C_{12}$), myristic ($C_{14}$), palmitic ($C_{16}$), stearic ($C_{18}$), eicosanoic ($C_{20}$), docosanoic ($C_{22}$), tetracosanoic ($C_{24}$), and mixtures thereof. $I_2$ values of coco fatty acid is about 5–10, for oleic acid is about 88–93, for a 50/50 mix of coconut acid and oleic acid is about 50 and coconut oil is about 9. Such soaps are known to be foaming materials, but can be used in the compositions of the invention if properly formulated with other components to suppress foaming.

A substantially neutral fat composition can be combined with the soluble inorganic salt and the fatty acid salt in the compositions of the invention. The fatty material cooperates with the other components to form a stable barrier coating and upon heating can react with the inorganic salt to form increased concentrations of the alkali metal or alkaline earth metal soap which can improve or promote subsequent removal. The preferred fat is a fat that has an amount of unsaturation that resists oxidative decomposition during heating cycles. The maximum concentration of unsaturation in the fatty material is less than 10 mole % or an $I_2$ value about 10. Such fats are commonly understood to be esters of a fatty acid with an alcohol, diol or triol with little or no free acid. Most commonly, such fats are a fatty acid monoester, diester or triester of glycerol. The glycerol fatty acid ester can contain a single fatty acid or mixtures of $C_{6-24}$ fatty acids, including those recited above. The fatty acid esters of the invention can comprise monoesters, diesters or triesters of glycerol in the compositions of the invention.

A substantially soluble organic thickener is used to provide thixotropy to the compositions of the invention. The preferred thickeners have some substantial proportion of water solubility to promote easy removability. Examples of soluble organic thickeners for the aqueous compositions of the invention comprise carboxylated vinyl polymers such as polyacrylic acids and sodium salts thereof, ethoxylated cellulose, polyacrylamide thickeners, xanthan compositions, guar gum, sodium alginate and algin products, hydroxypropyl cellulose, hydroxyethyl cellulose, and other similar aqueous thickeners that have some substantial proportion of water solubility. Preferred thickeners for use in the invention are guar gum, xanthan thickeners sold by the Kelco Division of Merck under the tradenames KELTROL, KELTROL-T, KELZAN, KELZAN D35, KELZAN S, KELZAN XZ, and others. Such xanthan polymers or mixtures of xanthan and a guar gum are preferred due to their high water solubility, a substantial yield stress value and great thickening power. Compositions of the invention can be made with small concentrations of xanthan thickeners yet remain substantially water soluble or dispersible using aqueous cleaners or mild aqueous detergent compositions.

BRIEF DESCRIPTION

FIG. 1 is a graphical representation of the pseudo-plastic or thixotropic nature of the compositions of the invention. In obtaining the information in the graph of FIG. 1, a composition of the invention is sheared in a viscometer beginning at 0 shear rate with a continuing increase in shear until the maximum shear obtainable in the mechanical system can be obtained (100% D). When the maximum shear is reached, the shear is decreased back to 0% shear. The Figure shows an initial graph (curve A) which represents the response of the material to the increasing shear and a second graph (curve B) relating to the response of the material to the reduction in shear. Near the origin (0 shear rate) the upper graph represents increase in shear rate while the lower graph represents decreasing shear rate. The yield stress value can be calculated from the graph by introducing the numerical shear stress value ($S^r$) obtained from the graph at the point the graph breaks from a substantially vertical line. In FIG. 1, in the increase in shear rate line, the break appears to be at about 0.2 while at the decreasing shear rate line, the break appears to be at about 0.1. Using the mathematical formulas set forth in the Figure, using a machine factor A of approximately 3.76 and a machine factor M of about 4.4, the yield point of the material is between 38 dynes-cm$^{-2}$ and 75 dynes-cm$^{-2}$ for the preferred formulation tested in the Figure.

FIGS. 2 and 3 show the discrete viscosity measurements of the material when sheared at an RPM in a Brookfield viscometer at room temperature using a No. 2 and a No. 3 spindle, respectively. These data clearly demonstrate the tremendous shear thinning of the composition even at low shear. The viscosity drops nearly 50% from about 23,000 cP at 0.5 RPM to about 13,000 cP at 1 RPM. At 50 RPM, the viscosity has dropped about 97% to 720 cP.

The aqueous coating compositions of the invention can be manufactured by blending the ingredients in commonly available manufacturing equipment to form a stable single phase aqueous solution or dispersion. The materials can be blended in any order of addition to achieve a final single phase mixture. However, the materials can be preferably blended by adding ingredients in order of decreasing solubility. Accordingly, depending on solubility and mode of manufacture, either the inorganic salt or the fatty acid soap can first be dispersed into service or deionized water in commonly available blending apparatus. After the soap and salt are uniformly mixed in the aqueous solution, the thickener can be added slowly until the uniform thickened mixture is obtained. Lastly, the fat material can be added. In the instance that the soap is created during the manufacture of the material, first introduce into mixing equipment a proportion of alkali metal base such as sodium hydroxide or potassium hydroxide into the water prior to the addition of the fatty acid. The fatty acid is then added to the aqueous base to create the soap in situ. After the addition of the fatty acid is complete, the inorganic salt can be followed by the other components. Exemplary formulations of the materials are found below in Tables 1 and 2.

TABLE 1

| | Formulations (wt %) | | |
|---|---|---|---|
| | Useful | Preferred | Most Preferred |
| Water (Service or D.I.) | Balance | Balance | Balance |
| Fatty Acid Soap | 0.1–20 | 0.2–10 | 0.5–10 |
| Inorganic Salt | 0.1–30 | 0.2–25 | 1–20 |
| Thickener | 0.01–10 | 0.05–10 | 0.1–3 |
| Fat (Neutral triglyceride) | 1–40 | 1–30· | 1–20 |

TABLE 2

| | Preferred Formulations (Parts by Weight) |
|---|---|
| Water (D.I.) | 300–500 |
| NaOH or KOH[1] (45% active, aqueous) | 2–10 |
| Fatty Acid[2] | 4–25 |
| Na$_3$PO$_4$ or K$_3$PO$_4$ | 10–50 |
| Xanthan | 0.1–10 |
| Neutral Substantially Saturated Fatty Oils[3] | 15–50 |

[1]Use roughly stoichiometric amounts of KOH and fatty acid.
[2]Fatty acid (50/50) blend of coconut fatty acid and oleic acid.
[3]Coconut oil/palm oil or mixtures thereof After manufacture, the compositions can be applied to a subsequently heated hard surfaces using a pump sprayer or aerosol spray device. In an aerosol spray device, the composition of the invention is combined with a propellant such as butane, propane, freon, nitrous oxide or other commonly available propellants or mixtures thereof. The amount of propellant used commonly ranges from about 5 to about 50 wt % of the contents of the aerosol container. In the instance a pump sprayer is used, the spray nozzle and the material are matched for viscosity purposes and material delivery. The thixotropic nature of the material substantially reduces the viscosity of the aqueous composition as the material is sprayed. The thixotropy of the material reduces the energy input required to spray the material through a pump sprayer.

After application of the aqueous material through the spray device occurs, the thixotropic nature of the material renders the coatings before drying, very thick and high in viscosity. Little or no sagging or running occurs due to the thickness of the coatings. However, should excess amounts of material be applied, some run off can occur. After application, the aqueous materials are dried at ambient conditions or at elevated temperatures to ensure the water is fully removed and the coatings dry to a white film-like organic/inorganic deposit. One preferred method for ensuring that the coatings of the invention are dried fully involves cycling the food preparation unit through a heating cycle wherein the composition reaches a temperature greater than about 100° C. up to about 300° C. for 10 to 40 minutes. The coatings of the invention when formed are inorganic/organic in nature, while flexible and robust are not hard or brittle. After drying the resulting coating thicknesses will range from about 0.02 to about 5 millimeters, preferably the thicknesses will range from about 0.01 to about 2 millimeters.

Once the films are fully formed, the oven can be operated in normal fashion. Foods can be inserted in the oven and cooked in normal cycles at recommended temperatures from typical recipes. No changes in the operation of the oven is required by the compositions of the invention. Since the materials of the invention are all considered food safe or food grade, no contamination problems are anticipated.

The following examples and data provide a basis for understanding the operation of the invention and include a best mode.

EXAMPLE 1

Into a 1000 milliliter glass container equipped with a motor driven stirrer, was placed 425.75 grams of deionized water. Agitation was initiated and into the stirred water was placed 6.25 grams of a 45 wt % active aqueous potassium hydroxide solution. After the addition of the potassium hydroxide was complete, 6.25 grams of a fatty acid blend, derived from coconut oil, comprising proportions of myristic, lauric, palmitic, stearic acid was slowly added to the stirred potassium hydroxide solution until uniform. Once the coco fatty acid addition was complete, 6.25 grams of oleic acid was slowly added to the soap solution. After agitation and the formation of a uniform soap solution, 25 grams of $K_3PO_4$ was added to the stirred mixture. The potassium phosphate was followed by 3.0 grams of a xanthan gum (KELTROL-T, produced by the Kelco Division of Merck Co.). The xanthan was slowly added to the aqueous mixture. Once the xanthan was added and fully dissolved, next 37.5 grams of coconut oil comprising a triglyceride ester of a mixture of fatty acids including myristic, lauric, palmitic, stearic and others was added. The blended composition took the form of a white dispersion of the neutral fat and soap in the thickened aqueous base. The material was thixotropic having high viscosity when calm and having comparatively relatively low viscosity when sheared.

The material was applied to a stainless steel tile, formed a coherent, adherent stable film and was baked in an oven for 72 hours at 500° F. The coating remained white, was robust and flexible but did not become brittle or fragile and did not separate on the surface. Two stainless steel tiles were treated with a composition and baked at a temperature between 400°–415° F. The material remained white and tightly adhered to the stainless steel tile. Typical food soils appearing in common gas fired ovens were applied to the coatings and baked for 4 hours at 400° F. The soils contracted demonstrating coating-soil repellency.

The baked-on soils were tested for removability. When contacted with an abrasive pad, the soils were readily removed with one swipe. When contacted with a flow of running water from a service water tap, the coating rinsed off instantly. The soils were easily removed by light contact between a sponge with the soil and coating materials.

The above specification, examples and experimentation provide a basis for understanding the invention. However, the invention can be made in a variety of embodiments without departing from the spirit and scope of the invention. Accordingly, the invention appears in the claims hereinafter appended.

We claim:

1. A method for forming a barrier coating on a vertical surface in a heated food preparation unit, which coating facilitates removal of hardened or baked-on food soils, said coating formed from an aqueous coating composition, which method comprises:
   (a) applying an aqueous coating composition, having a yield point of about 10–100 dynes-cm$^{-2}$, the composition comprising:
      (i) about 0.1 to 30 wt % of an inorganic salt composition having a minimum water solubility of 1 wt % in water;
      (ii) about 0.1 to 20 wt % of an alkali metal substantially saturated fatty acid soap composition;
      (iii) about 1 to 40 wt % of a substantially saturated neutral fat;
      (iv) about 0.01 to 10 wt % of a soluble polymeric organic thickener composition; and
      (v) water;
   wherein the coating composition is thixotropic and can cling to a substantially vertical surface and form a substantially uniform barrier between the surface and the soil; and
   (b) heating the barrier to form a dried barrier coating.

2. The composition of claim 1 wherein the inorganic salt composition comprises an alkali metal salt.

3. The composition of claim 1 wherein the alkali metal salt comprises an alkali metal salt of a strong acid.

4. The composition of claim 1 wherein the alkali metal salt comprises an alkali metal salt of a weak acid.

5. The composition of claim 1 wherein the alkali metal salt of a weak acid comprises an alkali metal salt of phosphoric acid.

6. The composition of claim 1 wherein the alkali metal salt comprises a potassium phosphate composition.

7. The composition of claim 1 wherein the alkali metal fatty acid soap comprises a salt of a $C_{6-24}$ saturated fatty acid.

8. The composition of claim 1 wherein the alkali metal salt of the fatty acid comprises a potassium salt of a fatty acid.

9. The composition of claim 1 wherein the substantially saturated fat comprises an ester of an alkanol, diol or triol with a substantially saturated $C_{6-24}$ fatty acid.

10. The composition of claim 1 wherein the substantially saturated fat comprises a glycerol ester of a $C_{6-24}$ substantially saturated fatty acid.

11. The composition of claim 1 wherein the substantially saturated fat comprises coconut oil or palm oil.

12. The composition of claim 1 wherein the soluble polymeric organic thickener composition comprises a cellulosic thickener.

13. The composition of claim 1 wherein the cellulosic thickener comprises carboxymethyl cellulose.

14. The composition of claim 1 wherein the thickener comprises a xanthan which is used at about 0.2 to 5 wt % and the composition has a yield point of about 30–80 dynes-cm$^{-2}$.

15. The method of claim 1 wherein the food preparation unit comprises an oven.

16. The method of claim 15 wherein the oven comprises a gas fired self-cleaning oven.

* * * * *

UNITED STATES PATENT AND TRADEMARK OFFICE
CERTIFICATE OF CORRECTION

PATENT NO. : 5,407,700  
DATED : April 18, 1995  
INVENTOR(S) : Victor F. Man et al Page 1 of 2

It is certified that error appears in the above-indentified patent and that said Letters Patent is hereby corrected as shown below:

On column Abstract, Line 21, please delete "inventions" and substitute therefore --invention--

On column 1, line 63, please delete "who teach" and substitute therefore --teaches--

On column 1, line 65, please delete "teach" and substitute therefore --teaches--

On column 2, line 32, please delete "teach" and substitute therefore --teaches--

On column 4, line 22, please delete "12" and substitute therefore --$I_2$--

On column 4, line 24, please delete "$C_{6-12}$" and substitute therefore --$C_{6-24}$--

On column 8, line 25, claim 2, please delete "composition" and substitute therefore --method--

On column 8, line 27, claim 3, please delete "composition" and substitute therefore --method--

On column 8, line 29, claim 4, please delete "composition" and substitute therefore --method--

On column 8, line 31, claim 5, please delete "composition" and substitute therefore --method--

On column 8, line 34, claim 6, please delete "composition" and substitute therefore --method--

On column 8, line 37, claim 7, please delete "composition" and substitute therefore --method--

On column 8, line 40, claim 8, please delete "composition" and substitute therefore --method--

On column 8, line 43, claim 9, please delete "composition" and substitute therefore --method--

On column 8, line 46, claim 10, please delete "composition" and substitute therefore --method--

On column 8, line 49, claim 11, please delete "composition" and substitute therefore --method--

UNITED STATES PATENT AND TRADEMARK OFFICE
CERTIFICATE OF CORRECTION

PATENT NO. : 5,407,700
DATED : April 18, 1995
INVENTOR(S) : Victor F. Man et al

It is certified that error appears in the above-indentified patent and that said Letters Patent is hereby corrected as shown below:

On column 8, line 51, claim 12, please delete "composition" and substitute therefore --method--

On column 8, line 54, claim 13, please delete "composition" and substitute therefore --method--

On column 8, line 56, claim 14, please delete "composition" and substitute therefore --method--

Signed and Sealed this

Eighteenth Day of July, 1995

Attest:

BRUCE LEHMAN

Attesting Officer     Commissioner of Patents and Trademarks